US012605975B1

(12) United States Patent
Lv et al.

(10) Patent No.: US 12,605,975 B1
(45) Date of Patent: Apr. 21, 2026

(54) TRAILER ASSEMBLY

(71) Applicant: Foshan Robin Hood Metal Products Co., Ltd., Foshan City (CN)

(72) Inventors: Yuping Lv, Daye City (CN); Jianwen Lv, Foshan City (CN)

(73) Assignee: Foshan Robin Hood Metal Products Co., Ltd., Foshan City (CN)

( * ) Notice: Subject to any disclaimer, the term of this patent is extended or adjusted under 35 U.S.C. 154(b) by 0 days.

(21) Appl. No.: 19/357,568

(22) Filed: Oct. 14, 2025

Related U.S. Application Data

(63) Continuation-in-part of application No. 19/206,247, filed on May 13, 2025.

(51) Int. Cl.
| | |
|---|---|
| *B60D 1/06* | (2006.01) |
| *B60D 1/07* | (2006.01) |
| *B60D 1/28* | (2006.01) |
| *B60D 1/46* | (2006.01) |

(52) U.S. Cl.
CPC .................. B60D 1/06 (2013.01); B60D 1/07 (2013.01); B60D 1/28 (2013.01); B60D 1/46 (2013.01)

(58) Field of Classification Search
CPC ... B60D 1/06; B60D 1/07; B60D 1/28; B60D 1/46
USPC .......................................................... 280/511
See application file for complete search history.

(56) References Cited

U.S. PATENT DOCUMENTS

| | | | | |
|---|---|---|---|---|
| 4,863,185 | A | * | 9/1989 | Coppe ...................... B60D 1/06 |
| | | | | 280/491.2 |
| 9,010,795 | B2 | | 4/2015 | Chamoun |
| RE47,102 | E | * | 10/2018 | Krespach ................. B60D 1/06 |
| 12,447,780 | B1 | * | 10/2025 | Luo ........................... B60D 1/06 |
| 2003/0052472 | A1 | * | 3/2003 | Moss ....................... B60D 1/54 |
| | | | | 280/491.1 |
| 2017/0253096 | A1 | * | 9/2017 | Li ............................ B60D 1/46 |
| 2022/0063358 | A1 | | 3/2022 | Evans |
| 2024/0140148 | A1 | * | 5/2024 | Tang ...................... B60D 1/241 |

FOREIGN PATENT DOCUMENTS

CN          222859137 U  *  5/2025

* cited by examiner

*Primary Examiner* — Alentin Neacsu
*Assistant Examiner* — Mohamed M Medani

(57) ABSTRACT

The present invention relates to a trailer assembly, which includes a traction ball head assembly, wherein the traction ball head assembly includes a traction ball seat and a traction ball connection assembly, the traction ball seat is provided with a connection through-hole for the traction ball connection assembly to pass through, a first keyway is formed on a hole wall of the connection through-hole, the traction ball connection assembly includes a traction ball head and a limiting clamping key, the traction ball head is provided with a second keyway matched with the first keyway, at least a portion of the traction ball head passes through the connection through-hole, one end of the traction ball head is threadingly locked and fixed to the traction ball seat, and circumferential limitation is achieved by engagement between the limiting clamping key and the keyways.

17 Claims, 4 Drawing Sheets

TRAILER ASSEMBLY

CROSS-REFERENCE TO RELATED PATENT APPLICATION

This application is a Continuation in Part of the U.S. application Ser. No. 19/206,247 filed on May 13, 2025, and entitled "ADJUSTABLE TRAILER COMPONENT", now pending, the entire disclosures of which are incorporated herein by reference.

BACKGROUND

A trailer ball head is typically configured for connection to a towed vehicle, such as a trailer or a disabled vehicle. In the prior art, two trailer ball heads are generally provided and inserted into upper and lower portions of a trailer arm. After installation, the trailer ball heads tend to exhibit poor stability, causing instability of a trailer assembly.

SUMMARY

A primary objective of the present invention is to provide a trailer assembly, which aims to solve unstable connection of the ball heads in existing trailer assemblies.

To achieve the above objective, the present invention provides the following technical solution. A trailer assembly includes a traction ball head assembly, wherein the traction ball head assembly includes a traction ball seat and a traction ball connection assembly detachably mounted on the traction ball seat, the traction ball seat is provided with a connection through-hole for the traction ball connection assembly to pass through, a first keyway is formed on a hole wall of the connection through-hole, the traction ball connection assembly includes a traction ball head and a limiting clamping key, the traction ball head is provided with a second keyway matched with the first keyway, at least a portion of the traction ball head passes through the connection through-hole, one end of the traction ball head is threadingly locked and fixed to the traction ball seat, and the traction ball head and the traction ball seat are circumferentially limited through engagement among the limiting clamping key, the first keyway, and the second keyway.

The traction ball head is detachably connected to the traction ball seat by being threadingly locked with the traction ball seat. Limitation between the traction ball head and the traction ball seat is achieved through engagement among the limiting clamping key, the first keyway, and the second keyway, so as to ensure stability. The structure is simple and reliable, and assembly is convenient.

The trailer assembly further includes a trailer arm connecting rod configured to be connected to a traction vehicle, and a traction ball connecting rod configured to be connected to a trailer.

In one embodiment, the traction ball connecting rod is connected to the trailer arm connecting rod through an adjusting assembly, and an end portion of the traction ball connecting rod is fixedly connected to the traction ball seat.

In another embodiment, the traction ball connecting rod is fixedly connected to the trailer arm connecting rod, and the traction ball connecting rod is connected to the traction ball seat through an adjusting assembly.

In a corresponding embodiment, a vertical height between the traction ball connecting rod and the trailer arm connecting rod is adjusted through an adjusting assembly, or the connection between the traction ball connecting rod and the traction ball seat is adjusted through the adjusting assembly, so as to achieve vertical height adjustment. Therefore, the trailer assembly is well applicable to different trailer traction operations, providing a wide range of applicability.

Figure 1A:
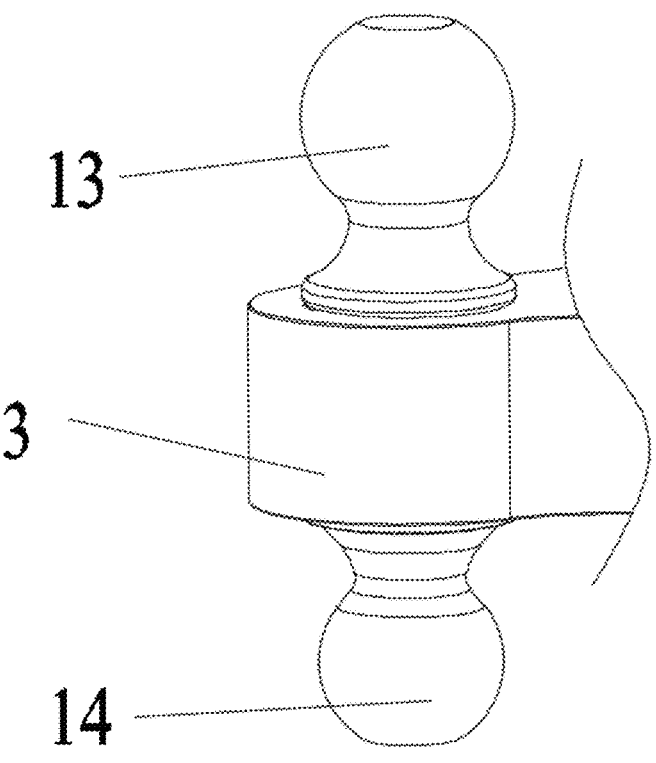
FIG. 1a is a schematic diagram of a structure of a traction ball head assembly according to the present invention.

Reference numerals: 1. trailer arm connecting rod; 2. traction ball connecting rod; 3. traction ball seat; 4. clamping plate; 5. first pin shaft; 6. second pin shaft; 7. adjusting hole; 8. numerical indicator; 9. first pin; 10. second pin; 11. connection through-hole; 12. first keyway; 13. upper traction ball; 14. lower traction ball; 15. traction ball shaft body; 16. second keyway; 17. limiting clamping key; 18. third convex step; 19. movable sealing cover; 191. second convex step; 20. first convex step; 21. first pin hole; 22. second pin hole; 23. sliding groove; 24. clamping portion; 25. bayonet; 26. mounting hole; 27. third pin hole; and 28. adjusting pin.

DETAILED DESCRIPTION OF THE EMBODIMENTS

The preferred embodiments of the present invention are described below in conjunction with the accompanying drawings. It should be understood that the preferred embodiments described herein are provided solely for illustrating and explaining the present invention, and are not intended to limit the present invention.

Referring to FIGS. 1 to 7, an adjustable trailer assembly provided by the present invention includes a traction ball head assembly, wherein the traction ball head assembly includes a traction ball seat 3 and a traction ball connection assembly detachably mounted on the traction ball seat 3, the traction ball connection assembly includes a traction ball head and a limiting clamping key 17, and the traction ball seat 3 serves as an integral load-bearing base component and is configured to be connected to a trailer arm of a traction vehicle and provide an installation reference. The traction ball head is configured to be directly connected to a towed vehicle, and a spherical structure of the traction ball head allows multi-angle rotation. The limiting clamping key 17 is configured to achieve circumferential limitation between the traction ball head and the traction ball seat 3.

Figure 3:
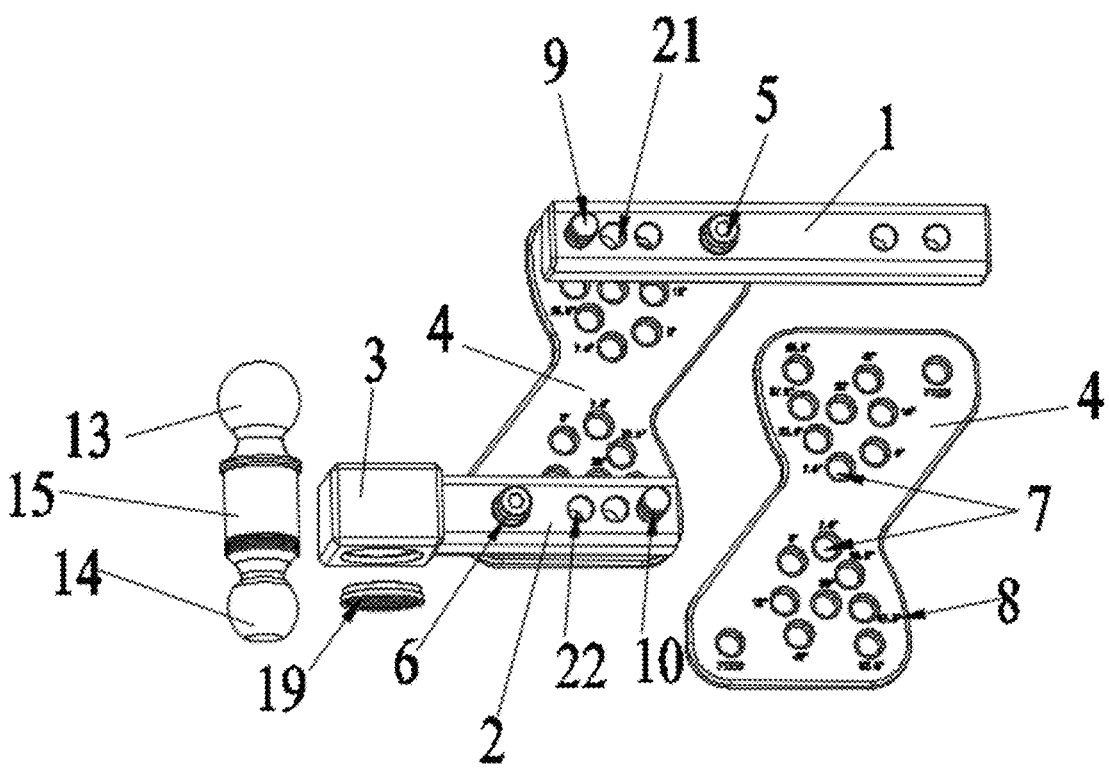
FIG. 3 is an exploded structural diagram of a trailer assembly according to the present invention in Embodiment 1.

Specifically, referring to FIG. 3, the traction ball seat 3 is provided with a connection through-hole 11 for the traction ball connection assembly to pass through. A first keyway 12 is formed on a hole wall of the connection through-hole 11. The traction ball head is provided with a second keyway 16 matched with the first keyway 12. At least a portion of the traction ball head passes through the connection through-hole 11, and one end of the traction ball head is threadingly locked and fixed to the traction ball seat 3. The traction ball head and the traction ball seat 3 are circumferentially limited through engagement among the limiting clamping key 17, the first keyway 12, and the second keyway 16. A dimension of the connection through-hole 11 ensures that a portion of the traction ball head can smoothly pass through the connection through-hole, and maintain only a minimal gap between a through-hole wall of the connection through-hole and the traction ball head, so as to limit radial shaking and provide preliminary positioning. The limiting clamping key 17 is a key component for achieving circumferential limitation, and a shape and dimension of the limiting clamping key are matched with the first keyway and the second keyway 16, forming a rigid connection upon insertion. Circumferential torque is transmitted through engagement of two sides of the clamping key with the first keyway 12 and the second keyway 16, thereby preventing relative rotation between the traction ball head and the traction ball seat 3. The threaded connection achieves axial fastening through screwing engagement between the traction ball head and the traction ball seat 3.

In the prior art, the trailer ball head is connected only by simple insertion or single fixation, which easily results in circumferential rotation or axial loosening due to vibration or torque. In this technical solution, through dual constraints provided by thread locking and the limiting clamping key 17, the circumferential constraint ensures stable transmission of torque when a traction force is transmitted, and the axial constraint prevents loosening. Therefore, the relative movement is eliminated in two directions, solving poor stability and ensuring that the assembly exhibits no loosening or displacement during the traction process.

Specifically, the traction ball head is made of high-strength metal materials, such as alloy structural steel or high-strength aluminum alloy. The traction ball head includes an upper traction ball 13, a traction ball shaft body 15 and a lower traction ball 14 which are integrally formed. Both an outer diameter of the traction ball shaft body 15 and an outer diameter of the lower traction ball 14 are smaller than an inner diameter of the connection through-hole 11. The upper traction ball 13 and the lower traction ball 14 are spherical structures at two ends of the traction ball head, and are configured to be connected to a towed vehicle, auxiliary hooks, or the like. Since both the outer diameter of the traction ball shaft body 15 and the outer diameter of the lower traction ball 14 are smaller than the inner diameter of the connection through-hole 11, both the traction ball shaft body and the lower traction ball can smoothly pass through the connection through-hole 11 of the traction ball seat 3, providing a basis for subsequent thread locking. The integrally formed structure ensures continuous force transmission between the upper and lower traction balls 14 and the shaft body, avoiding the risk of fracture at a joint. Compared with a split-type ball head structure, the integrally formed traction ball head in this embodiment has a simpler structure, is easier to install, and is less prone to fracture.

To ensure the stability of the threaded connection, in this embodiment, external threads (not labeled in the figures) are provided on one side of the traction ball shaft body 15 close to the lower traction ball 14, and a movable sealing cover 19 is additionally connected to the traction ball shaft body 15. Specifically, a first convex step 20 is provided on a peripheral side of the connection through-hole 11. The movable sealing cover 19 is provided with internal threads (not labeled in the figures), and a second convex step 191 is provided on one end of the movable sealing cover close to the traction ball seat 3. The movable sealing cover 19 is sleeved on an outer side of the lower traction ball 14 close to the traction ball shaft body 15 and threadingly connected to the traction ball shaft body 15. In a case where the movable sealing cover 19 is threadingly locked with the traction ball shaft body 15, the second convex step 191 of the movable sealing cover 19 abuts against a lower end surface of the traction ball shaft body 15, and a front end of the movable sealing cover abuts against the first convex step 20.

The external threads on the traction ball shaft body 15 cooperate with the movable sealing cover 19 to achieve a threaded connection, and a limiting cooperation is formed by the first convex step 20 and the second convex step 191. During assembly, the movable sealing cover 19 is sleeved onto the lower traction ball 14 and screwed onto the external threads of the traction ball shaft body 15. As the threads are tightened, the movable sealing cover 19 moves toward the traction ball seat 3 until the second convex step 191 abuts against the lower end surface of the traction ball shaft body 15, thereby preventing the movable sealing cover 19 from over-screwing. Meanwhile, the front end of the movable sealing cover 19 abuts against the first convex step 20, and the reaction force from the first convex step 20 presses the traction ball head upward. Ultimately, axial fastening between the traction ball head and the traction ball seat 3 is achieved through the combined action of thread pre-tightening and convex step limitation.

In other embodiments, internal threads may be provided on the traction ball seat 3, and external threads may be provided on the lower traction ball 14 or the traction ball shaft body 15 to achieve threaded engagement. In a further preferred embodiment, an anti-loosening adhesive or a spring washer may be additionally provided to further enhance locking reliability.

Preferably, a third convex step 18 is provided on one side of the upper traction ball 13 connected to the traction ball shaft body 15. In a case where the traction ball connection assembly is mounted on the traction ball seat 3, the third convex step 18 abuts against an upper end surface of the traction ball seat 3.

The third convex step 18 is an annular structure protruding outward at a connection portion between the upper traction ball 13 and the traction ball shaft body 15. The core function of the third convex step is to serve as an axial positioning reference during assembly of the traction ball head, while also bearing load and providing a limiting function. In a case where the traction ball connection assembly passes through the connection through-hole 11 of the traction ball seat 3, the upper traction ball 13 moves downward with the shaft body until the third convex step 18 abuts against the upper end surface of the traction ball seat 3. In this case, the traction ball head cannot move further downward, achieving precise positioning during assembly. The movable sealing cover 19 applies an upward pressing force to the lower end of the traction ball head, and the third convex step 18 together with the movable sealing cover 19 forms a bidirectional axial constraint of "top-and-bottom clamping", so that the traction ball head is stably clamped on the traction ball seat 3. This design not only prevents the traction ball head from being excessively inserted into the connection through-hole 11 and causing assembly misalignment, but also distributes the vertical load transmitted by the upper traction ball 13 through the large-area contact between the convex step and the end surface of the ball seat, thereby reducing local stress concentration. Therefore, the problem of surface wear and uneven stress on the upper end of the ball seat when relying solely on threaded locking is solved, further enhancing the overall assembly stability.

Preferably, the second keyway 16 is arranged between the external thread and the second convex step 191. When the movable sealing cover 19 is tightened until the second convex step 191 abuts against the lower end surface of the traction ball shaft body 15, the sealing cover does not cover or interfere with the second keyway 16. The length of the limiting clamping key 17 is smaller than the lengths of the first keyway 12 and the second keyway 16, ensuring that the limiting clamping key 17 can be flexibly inserted and removed. In this embodiment, the limiting clamping key 17 is a round-head flat key, and the second keyway 16 is a rectangular keyway adapted to the round-head flat key. In other embodiments, the limiting clamping key 17 may be a semicircular key, a wedge key, or the like. One or a plurality of sets of keyways and limiting clamping keys 17 may be provided. Such configurations should not be construed as limiting the present invention.

Figure 1B:
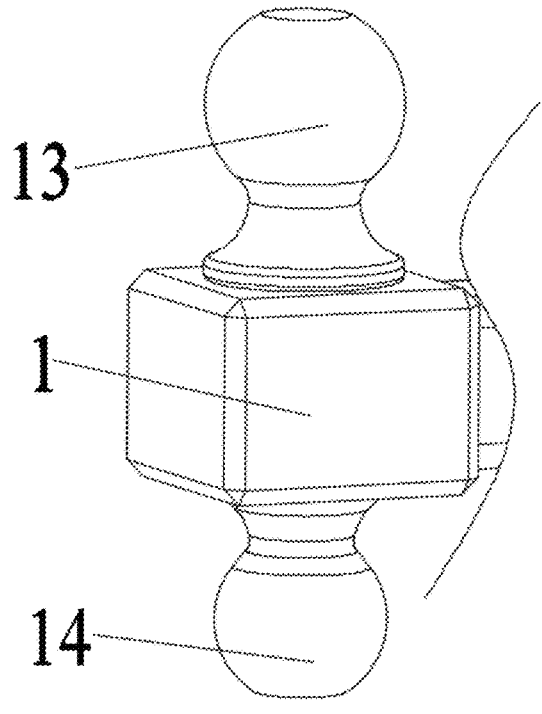
FIG. 1b is a schematic diagram of another structure of a traction ball head assembly according to the present invention.
Figure 2:
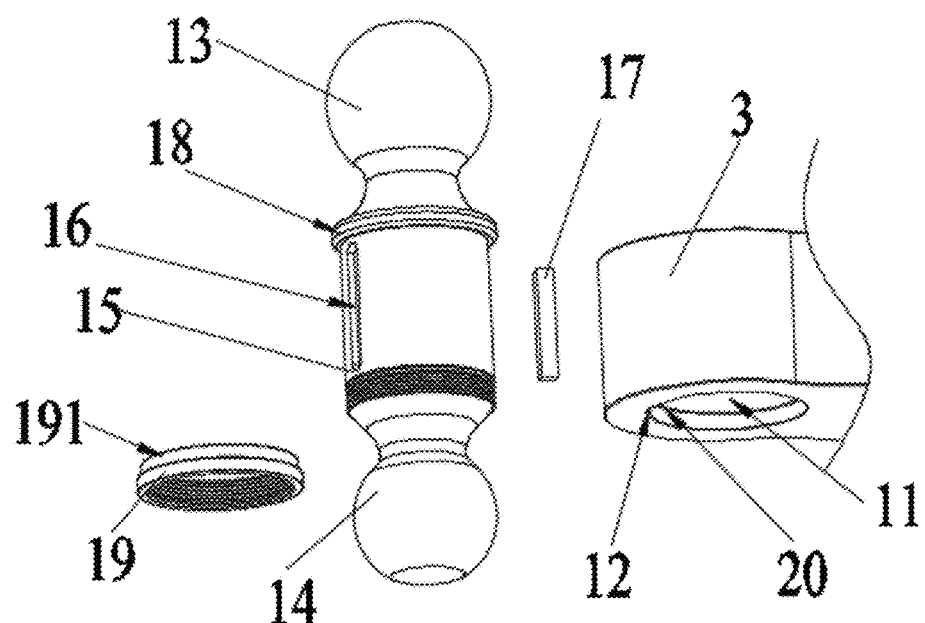
FIG. 2 is an exploded diagram of a structure of a traction ball head assembly according to the present invention.

Referring to FIGS. 1a and 1b, a radial cross-section of the traction ball seat 3 may have any one of a circular, square, polygonal, or irregular shape, and the shape should not be construed as limiting this embodiment. The connection through-hole 11 is provided to extend axially through the traction ball seat 3.

Below, the specific application of the corresponding traction ball head in the trailer assembly is described in conjunction with other related structures of the trailer assembly.

Embodiment 1

Figures 4, 5:
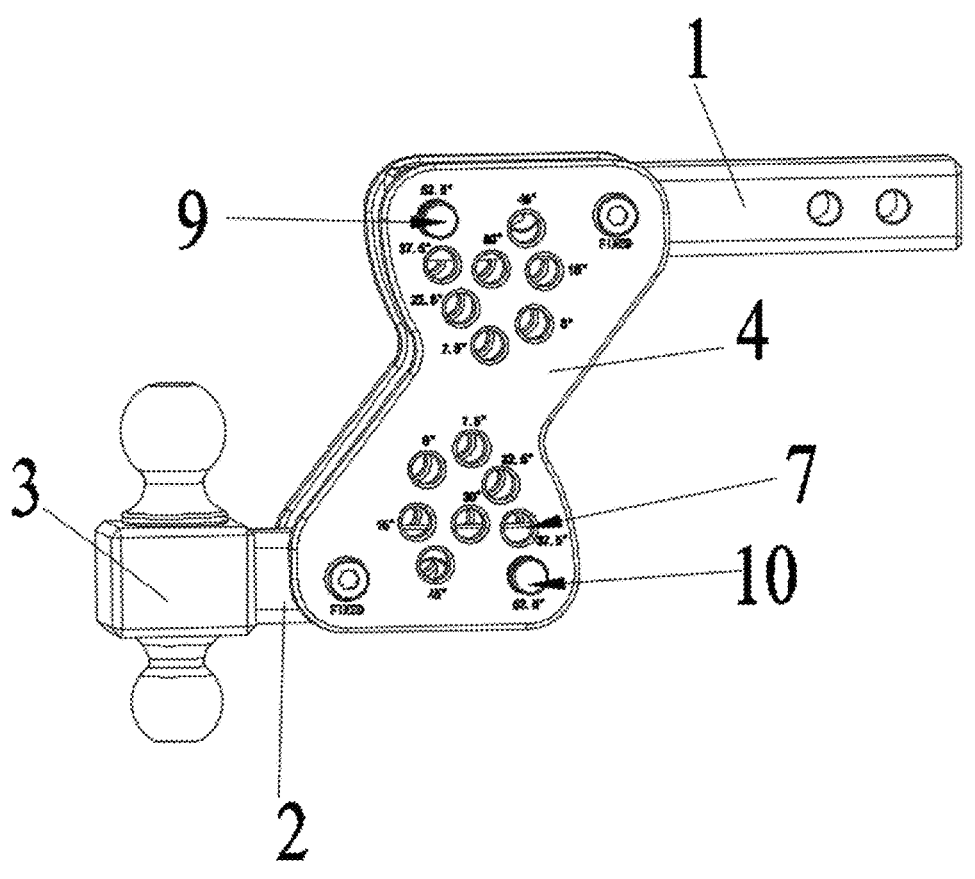
FIG. 4 is a schematic structural diagram of the present invention in a case where a traction ball connecting rod is located at a highest position.
FIG. 5 is a schematic structural diagram of the present invention in a case where a traction ball connecting rod is located at a lowest position.

In this embodiment, referring to FIGS. 3 to 5, other structures of the trailer assembly are defined. The trailer assembly further includes a trailer arm connecting rod 1 and a traction ball connecting rod 2. The trailer arm connecting rod 1 is an elongated member configured to be connected to a traction vehicle, and the traction ball connecting rod 2 serves as an intermediate connecting member between the traction ball head assembly and the trailer arm connecting rod 1. In this embodiment, an end of the corresponding traction ball connecting rod 2 is fixedly connected to the traction ball seat 3. To allow the trailer assembly to be adapted for different trailer traction operations, the traction ball connecting rod 2 and the trailer arm connecting rod 1 are connected through an adjusting assembly.

The adjusting assembly is located as an intermediate device connecting the traction ball connecting rod 2 and the trailer arm connecting rod 1, and is configured to adjust the relative position between the trailer arm connecting rod 1 and the traction ball connecting rod 2, so as to adapt to different traction scenarios. During traction, the traction force is transmitted from the traction vehicle to the trailer arm connecting rod 1. The adjusting assembly may be adjusted according to the height difference between the traction vehicle and the towed vehicle, ensuring that the traction force is transmitted along a proper path and preventing component distortion or fracture caused by a rigid connection. The traction ball connecting rod 2 and the traction ball seat 3 may be of an integrally formed structure, with the traction ball connecting rod 2 extending from one side of the traction ball seat 3. The integrally formed structure is advantageous for enhancing continuity of force transmission and structural stability. In other embodiments, the traction ball connecting rod 2 and the traction ball seat 3 may be fixedly connected.

Specifically, the adjusting assembly includes two clamping plates 4. The trailer arm connecting rod 1 is pivotally connected to the tops of the two clamping plates 4 via a first pin shaft 5, and the traction ball connecting rod 2 is pivotally connected to the bottoms of the two clamping plates 4 via a second pin shaft 6. It should be noted that both the upper and lower portions of the two clamping plates 4 are provided with a fixed hole (not labeled in the figures). The fixed hole is configured to install the first pin shaft 5 and the second pin shaft 6. The upper and lower portions of the two clamping plates 4 are symmetrically provided with a plurality of adjusting holes 7. The trailer arm connecting rod 1 is provided with a plurality of first pin holes 21, and a first pin 9 is adjustably inserted through the first pin holes into the adjusting holes 7 on the upper portion of the clamping plate 4. The traction ball connecting rod 2 is provided with a plurality of second pin holes 22, and a second pin 10 is adjustably inserted through the second pin holes into the adjusting holes 7 on the lower portion of the clamping plate 4.

Further, the clamping plates 4 in this embodiment are Z-shaped, at least one of the clamping plates 4 is provided with a numerical indicator 8 for indicating the angle of the corresponding adjusting hole 7, and the numerical indicator 8 is located on a periphery of the adjusting hole 7. In other possible embodiments, the corresponding clamping plates 4 may also have a rhombic or other shape. The corresponding numerical indicator 8 may be provided only on one of the clamping plates 4, or both clamping plates 4 may be provided with the corresponding numerical indicators 8.

It should be noted that, in the present invention, two sets of adjusting holes 7 are symmetrically provided on each clamping plate 4, and are symmetrically arranged about a rotation center defined by a line connecting the first pin shaft 5 and the second pin shaft 6. Eight adjusting holes 7 in each set are preferably provided. The numerical indicators 8 arranged on one side of the eight adjusting holes 7 in the same set are preferably set as 0°, 7.5°, 15°, 22.5°, 30°, 37.5°, 45°, and 52.5°. The trailer arm connecting rod 1 is provided with first pin holes 21, and the first pin 9 is inserted through the adjusting holes 7 and the first pin holes 21 to be fixed on the upper portions of the two clamping plates 4. The traction ball connecting rod 2 is provided with second pin holes 22, and the second pin 10 is inserted through the adjusting holes 7 and the second pin holes 22 to be fixed on the lower portions of the two clamping plates 4. The first pin 9 may be inserted into any adjusting hole 7 on the upper portions of the clamping plates 4, and the second pin 10 may be inserted into any adjusting hole 7 on the lower portions of the clamping plates 4. In a case where the trailer arm connecting rod 1 and the traction ball connecting rod 2 are arranged in parallel, the first pin 9 and the second pin 10 are respectively inserted into adjusting holes 7 located on the upper and lower portions of the clamping plates 4 and having the same numerical indicator 8.

As shown in FIG. 5, in a case where the first pin 9 and the second pin 10 are respectively inserted into the adjusting holes 7 located on one side of the upper and lower portions of the clamping plate 4 and having the numerical indicator 8 of 0°, the trailer arm connecting rod 1 and the traction ball connecting rod 2 are parallel, and the traction ball connecting rod 2 is located at the lowest position. As shown in FIG. 4, in a case where the first pin 9 and the second pin 10 are respectively inserted into the adjusting holes 7 located on one side of the upper and lower portions of the clamping plate 4 and having the numerical indicator 8 of 52.5°, the trailer arm connecting rod 1 and the traction ball connecting rod 2 are parallel, and the traction ball connecting rod 2 is located at the highest position. Therefore, an operator can perform adjustment sequentially from the hole position of the adjusting hole 7 having the numerical indicator of 0° to the hole position of the adjusting hole 7 having the numerical indicator of 52.5°, so that the height of the traction ball connecting rod 2 is spaced by an inch from the previous position. That is, as the numerical indicator 8 increases, the height of the traction ball connecting rod 2 decreases, thereby adjusting different heights of the traction ball connecting rod 2. In addition, the trailer arm connecting rod 1 and the traction ball connecting rod 2 can be connected in a normal mounting manner or in a reverse mounting manner. According to the normal mounting manner, in a case where the trailer arm connecting rod 1 is mounted on a top of the clamping plate 4 and the traction ball connecting rod 2 is mounted on a bottom of the clamping plate 4, as the numerical indicator 8 increases, the height of the traction ball connecting rod 2 decreases downward. According to the reverse mounting manner, in a case where the trailer arm connecting rod 1 is mounted on a bottom of the clamping plate 4 and the traction ball connecting rod 2 is mounted on a top of the clamping plate 4, as the numerical indicator 8 increases, the height of the traction ball connecting rod 2 increases upward. In summary, the adjusting assembly not only has the function of connecting a traction vehicle and a trailer, but also allows an operator to conveniently perform adjustment by inserting the first pin 9 and the second pin 10 into corresponding positions without disassembling the two clamping plates 4 or the trailer arm connecting rod 1 and the traction ball connecting rod 2, thereby conveniently adjusting the vertical height between the traction ball connecting rod 2 and the trailer arm connecting rod 1. Therefore, the trailer assembly is well applicable to different trailer traction operations, providing a wide range of applicability.

Embodiment 2

Figure 6:
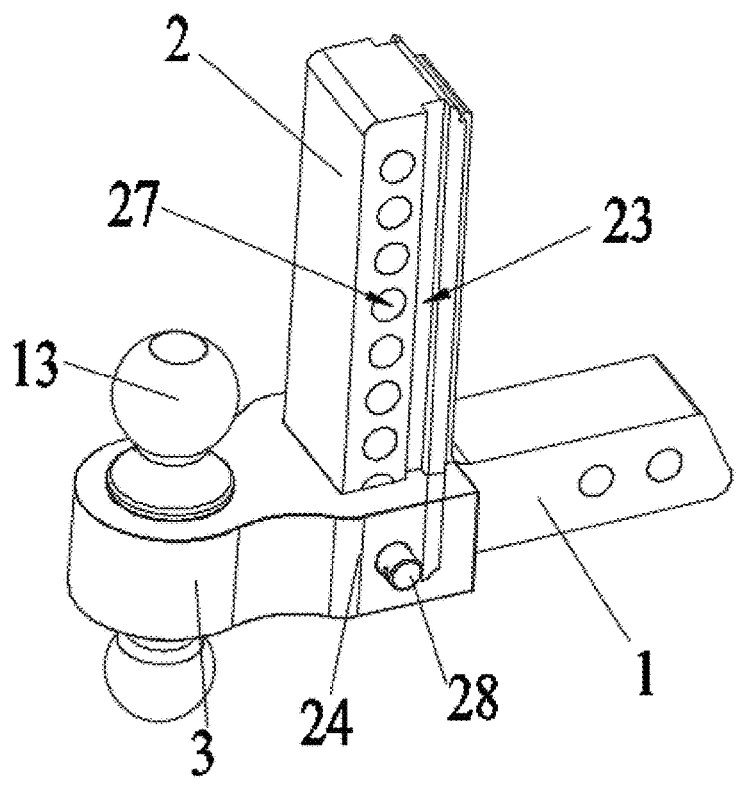
FIG. 6 is a schematic structural diagram of a trailer assembly according to the present invention in Embodiment 2.
Figure 7:
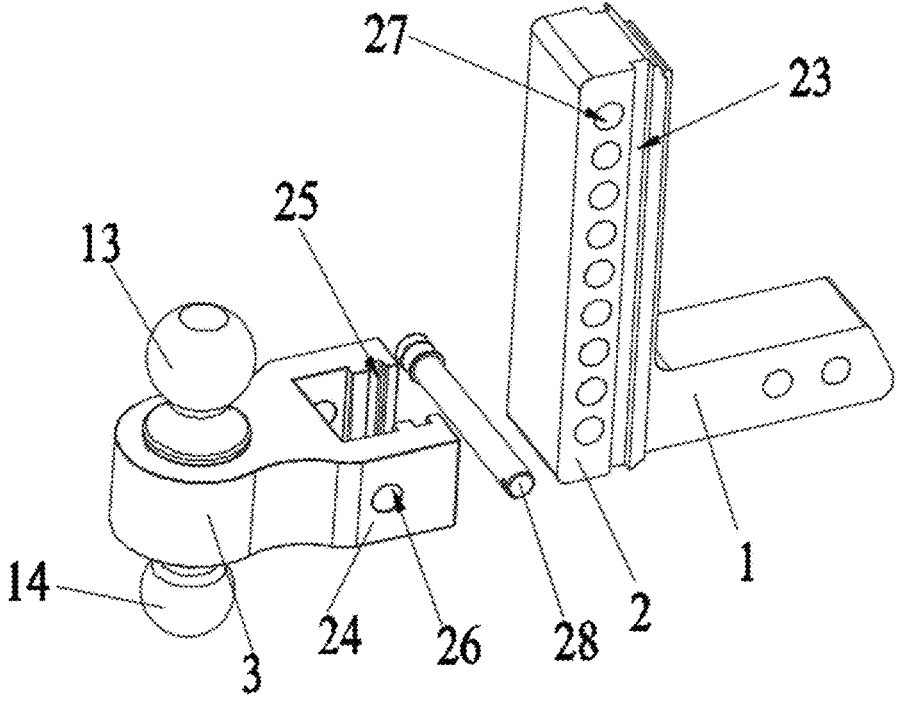
FIG. 7 is an exploded structural diagram of a trailer assembly according to the present invention in Embodiment 2.

Referring to FIGS. 6 and 7, in this embodiment, in a corresponding trailer assembly, the traction ball connecting rod 2 is fixedly connected to the trailer arm connecting rod 1, and the traction ball connecting rod 2 is connected to the traction ball seat 3 through an adjusting assembly, thereby adapting to different trailer traction operations.

In this embodiment, the adjusting assembly is adopted to achieve height adjustment between the traction ball head assembly and the trailer arm connecting rod 1 by adjusting a connection position between the traction ball connecting rod 2 and the traction ball seat 3. Specifically, the traction ball connecting rod 2 is a vertical rod, a sliding groove 23 is formed in the traction ball connecting rod along a vertical direction, one side of the traction ball seat 3 extends outward to form a clamping portion 24, and a bayonet 25 configured to be in a sliding fit with the traction ball connecting rod 2 is provided on an inner side of the clamping portion 24, thereby achieving a sliding fit between the traction ball connecting rod 2 and the traction ball seat 3 and further enabling locking through the adjusting assembly. Further, the clamping portion 24 is provided with at least one mounting hole 26, and the traction ball connecting rod 2 is provided with a plurality of third pin holes 27 along the vertical direction. The adjusting assembly includes an adjusting pin 28, and the adjusting pin 28 passes through the third pin hole 27 and the mounting hole 26 to connect the traction ball connecting rod 2 with the traction ball seat 3.

During adjustment, the traction ball seat 3 is in a sliding fit with the sliding groove 23 of the traction ball connecting rod 2 through the bayonet 25 of the clamping portion 24, and moves along a length direction of the connecting rod to adjust a vertical position of the traction ball seat 3. In a case where the movement reaches a position adapted to a connection point of a towed vehicle, the mounting hole 26 of the clamping portion 24 aligns with a corresponding third pin hole 27, and the adjusting pin 28 is inserted through the mounting hole and the third pin hole, thereby restricting relative sliding through rigidity of the pin body and completing position fixation.

In this embodiment, the trailer arm connecting rod 1 and the traction ball connecting rod 2 are arranged in an L-shape and are of an integrally formed structure. The L-shaped structure forms a reasonable force transmission path within a limited space, avoiding installation interference of a conventional straight-type connecting rod. The integral design ensures structural rigidity, allowing traction force to be seamlessly transmitted from the trailer arm connecting rod 1 through the L-shaped corner to the traction ball connecting rod 2 and then to the traction ball seat 3, thereby ensuring continuous and stable force flow.

The foregoing description is merely a preferred embodiment of the present invention, and those skilled in the art can make modifications to the present invention or convert the modifications into an equivalent technical solution by using the technical solutions described above. Therefore, any simple modifications or equivalent substitutions made based on the technical solutions of the present invention fall within the scope of the present invention as claimed.

What is claimed is:

1. A trailer assembly, comprising a traction ball head assembly, wherein the traction ball head assembly comprises a traction ball seat and a traction ball connection assembly detachably mounted on the traction ball seat, the traction ball seat is provided with a connection through-hole for the traction ball connection assembly to pass through, a first keyway is formed on a hole wall of the connection through-hole, the traction ball connection assembly comprises a traction ball head and a limiting clamping key, the traction ball head is provided with a second keyway matched with the first keyway, at least a portion of the traction ball head passes through the connection through-hole, one end of the traction ball head is threadingly locked and fixed to the traction ball seat, and the traction ball head and the traction ball seat are circumferentially limited through engagement among the limiting clamping key, the first keyway, and the second keyway;

wherein a length of the limiting clamping key is smaller than lengths of the first keyway and the second keyway.

2. The trailer assembly according to claim 1, wherein the traction ball head comprises an upper traction ball, a traction ball shaft body and a lower traction ball which are integrally formed, and both an outer diameter of the traction ball shaft body and an outer diameter of the lower traction ball are smaller than an inner diameter of the connection through-hole.

3. The trailer assembly according to claim 2, wherein external threads are provided on one side of the traction ball shaft body close to the lower traction ball, a first convex step is provided on a peripheral side of the connection through-hole, the traction ball connection assembly further comprises a movable sealing cover, the movable sealing cover is provided with internal threads, a second convex step is provided on one end of the movable sealing cover close to the traction ball seat, the movable sealing cover is sleeved on an outer side of the lower traction ball close to the traction ball shaft body and threadingly connected to the traction ball shaft body, in a case where the movable sealing cover is threadingly locked with the traction ball shaft body, the second convex step of the movable sealing cover abuts against a lower end surface of the traction ball shaft body, and a front end of the movable sealing cover abuts against the first convex step.

4. The trailer assembly according to claim 3, wherein a third convex step is provided on one side of the upper traction ball connected to the traction ball shaft body, and in a case where the traction ball connection assembly is mounted on the traction ball seat, the third convex step abuts against an upper end surface of the traction ball seat.

5. The trailer assembly according to claim 4, wherein the second keyway is arranged between the external thread and the second convex step.

6. The trailer assembly according to claim 1, wherein the limiting clamping key is a round-head flat key, and the second keyway is a rectangular keyway adapted to the round-head flat key.

7. The trailer assembly according to claim 3, wherein a radial cross-section of the traction ball seat has any one of a circular, square, polygonal, or irregular shape, and the connection through-hole is provided to extend axially through the traction ball seat.

8. The trailer assembly according to claim 7, wherein the trailer assembly further comprises a trailer arm connecting rod and a traction ball connecting rod, the traction ball connecting rod is connected to the trailer arm connecting rod through an adjusting assembly, and an end portion of the traction ball connecting rod is fixedly connected to the traction ball seat.

9. The trailer assembly according to claim 8, wherein the adjusting assembly comprises two clamping plates, the trailer arm connecting rod is pivotally connected to upper portions of the two clamping plates via a first pin shaft, the traction ball connecting rod is pivotally connected to lower portions of the two clamping plates via a second pin shaft, and the upper portions and the lower portions of the two clamping plates are symmetrically provided with a plurality of adjusting holes; the trailer arm connecting rod is provided with a plurality of first pin holes, and a first pin is adjustably inserted through the first pin holes into the adjusting holes on the upper portion of the clamping plate; and the traction ball connecting rod is provided with a plurality of second pin holes, and a second pin is adjustably inserted through the second pin holes into the adjusting holes on the lower portion of the clamping plate.

10. The trailer assembly according to claim 9, wherein at least one of the clamping plates is provided with a numerical indicator for indicating an angle of a corresponding adjusting hole, and the numerical indicator is located on a periphery of the corresponding adjusting hole.

11. The trailer assembly according to claim 9, wherein the clamping plate is Z-shaped.

12. The trailer assembly according to claim 8, wherein the traction ball connecting rod and the traction ball seat are of an integrally formed structure.

13. The trailer assembly according to claim 7, wherein the trailer assembly further comprises a trailer arm connecting rod and a traction ball connecting rod, the traction ball connecting rod is fixedly connected to the trailer arm connecting rod and is adjustably connected to the traction ball seat through an adjusting assembly.

14. The trailer assembly according to claim 13, wherein the traction ball connecting rod is provided with a sliding groove; the traction ball seat extends to form a clamping portion, and an inner side of the clamping portion is provided with a bayonet configured to slidably fit with the traction ball connecting rod; the clamping portion is provided with at least one mounting hole, and the traction ball connecting rod is provided with a plurality of third pin holes along a length direction of the traction ball connecting rod; and the adjusting assembly comprises an adjusting pin, and the adjusting pin is inserted through the third pin hole and the mounting hole to fixedly connect the traction ball connecting rod with the traction ball seat.

15. The trailer assembly according to claim 14, wherein the trailer arm connecting rod and the traction ball connecting rod are arranged in an L-shape and are of an integrally formed structure.

16. A trailer assembly, comprising a traction ball head assembly, wherein the traction ball head assembly comprises a traction ball seat and a traction ball connection assembly detachably mounted on the traction ball seat, the traction ball seat is provided with a connection through-hole for the traction ball connection assembly to pass through, a first keyway is formed on a hole wall of the connection through-hole, the traction ball connection assembly comprises a traction ball head and a limiting clamping key, the traction ball head is provided with a second keyway matched with the first keyway, at least a portion of the traction ball head passes through the connection through-hole, one end of the traction ball head is threadingly locked and fixed to the traction ball seat, and the traction ball head and the traction ball seat are circumferentially limited through engagement among the limiting clamping key, the first keyway, and the second keyway;

wherein the limiting clamping key is a round-head flat key, and the second keyway is a rectangular keyway adapted to the round-head flat key.

17. A trailer assembly, comprising a traction ball head assembly, wherein the traction ball head assembly comprises a traction ball seat and a traction ball connection assembly detachably mounted on the traction ball seat, the traction ball seat is provided with a connection through-hole for the traction ball connection assembly to pass through, a first keyway is formed on a hole wall of the connection through-hole, the traction ball connection assembly comprises a traction ball head and a limiting clamping key, the traction ball head is provided with a second keyway matched with the first keyway, at least a portion of the traction ball head passes through the connection through-hole, one end of the traction ball head is threadingly locked and fixed to the traction ball seat, and the traction ball head and the traction ball seat are circumferentially limited through engagement among the limiting clamping key, the first keyway, and the second keyway;

wherein the trailer assembly further comprises a trailer arm connecting rod and a traction ball connecting rod, the traction ball connecting rod is connected to the trailer arm connecting rod through an adjusting assembly; the adjusting assembly comprises two clamping plates; upper portions and lower portions of the two clamping plates are symmetrically provided with a plurality of adjusting holes; at least one of the clamping plates is provided with a numerical indicator for indicating an angle of a corresponding adjusting hole, and the numerical indicator is located on a periphery of the corresponding adjusting hole.

\* \* \* \* \*